UNITED STATES PATENT OFFICE.

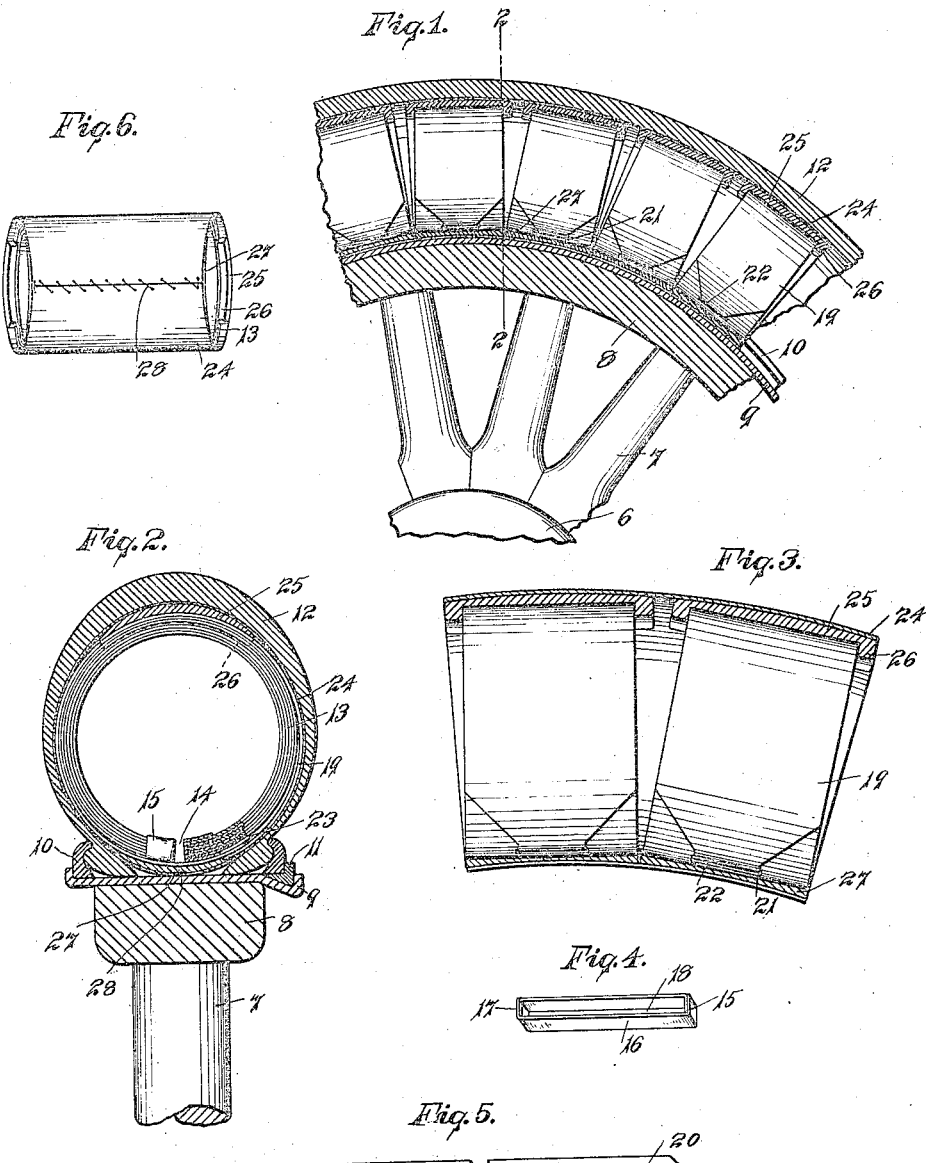
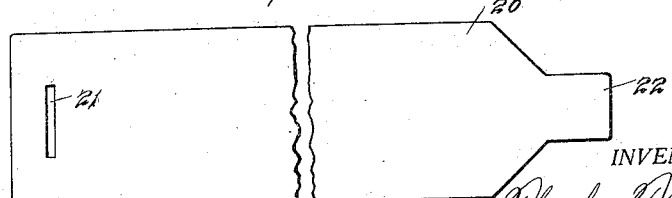

THEODORE THOMAS MILLER, OF WEST SUFFIELD, CONNECTICUT.

RESILIENT TIRE.

1,243,328. Specification of Letters Patent. Patented Oct. 16, 1917.

Application filed January 8, 1914. Serial No. 810,992.

*To all whom it may concern:*

Be it known that I, THEODORE THOMAS MILLER, a citizen of the United States, residing at West Suffield, in the county of Hartford and State of Connecticut, have invented a new and Improved Resilient Tire, of which the following is a specification.

My invention relates to that class of tires in which the resilient features are produced by mechanical means, and an object of my invention, among others, is to provide resilient means that may be readily applied to the tires in common use and of well known construction; and a further object of the invention is to provide a particularly durable and efficient means for attaining the end in view.

One form of device embodying my invention and in the construction and use of which the objects herein set out, as well as others, may be attained, is illustrated in the accompanying drawings, in which—

Figure 1 is a view in central longitudinal section through a portion of the tire of a wheel embodying my invention, a portion of the wheel also being shown.

Fig. 2 is a view in cross section through the same, on plane denoted by dotted line 2—2 of Fig. 1, scale enlarged.

Fig. 3 is a detail sectional view, scale enlarged, of one of the resilient sections.

Fig. 4 is a detail perspective view of one of the ties for the ends of the springs.

Fig. 5 is a detail view of a fragment of the strip composing a spring casing.

Fig. 6 is a detail view showing the means for securing the meeting edges of the pocket.

In the accompanying drawings the numeral 6 denotes a portion of the hub of a wheel, 7 the spokes, 8 the felly, 9 the felly rim, 10 the holding rings, and 11 the clamping ring of a wheel of ordinary construction. The tire casing 12 may also be of any ordinary construction, the parts embodying my invention and forming the subject matter hereof being such that they may be readily used within the tire casing or shoe of any of the ordinary structures now in common use.

In effecting the results last mentioned I employ a series of springs 13, disposed throughout the length of the tire casing at suitable distances apart, each of these springs being of circular form and consisting of a plural number of strips of spring metal resting one against the other, the ends of the strips being evenly disposed and the opposite ends of each spring being separated a short distance providing a space 14 for a purpose to be hereinafter described. The ends of each of the springs are held within a holder or socket member 15 preferably formed of sheet metal cut to the shape and bent to produce sides 16, ends 17 and a bottom 18, the opposite side being left open for entry of the ends of the spring. This construction provides a holder for the several parts composing each spring that permits a certain freedom of action for each of the strips of metal composing the spring, said strips being freely slidable in a circumferential direction one upon another, and the latter, as a whole, may be reduced in size circumferentially to a certain extent, owing to the presence of the space 14, so that the free edge of the tire 12 may be readily inserted in place beneath one of the holding rings 10.

Each of the springs 13 is enveloped by a casing 19, prepared from a strip of metal 20 having an opening 21 at one end and a tongue 22 at the opposite end adapted to be passed into the opening 21 and to be backturned therefrom as at 23 (see Fig. 2 of the drawing) to secure the ends of the casing together. In the preferred form of construction I arrange the springs in pairs within a pocket 24 preferably formed from a piece of fabric of sufficient durability to withstand the wear to which it is subjected, filling pieces 25 being inserted between the casing and pocket at the outer sides of the springs, these filling pieces having lips 26 engaging opposite edges of the springs to hold them in place, as shown in Fig. 3 of the drawings.

These filling pieces are so formed that the outer surface will partake of the circular form of the tire casing circumferentially, as well as crosswise, while the inner surface of said filling piece will be straight in one direction to fit the outer surface of the casing, as clearly shown in Fig. 3 of the drawing. Filling pieces 27 are also provided for the opposite sides of the springs, these pieces also being made to conform to the curved surfaces of the tire casing or felly rim and likewise to the outer surface of the casing 19, as clearly shown in Fig. 3 of the drawings. These filling pieces are preferably composed of rubber or other durable fibrous material. The edges of the pockets 24 are preferably secured as by means of lacings 28, as clearly shown in Fig. 6 of the drawings.

A pair of springs incased as described and provided with the appurtenant filling pieces being secured within each of the pockets may be easily inserted within any tire casing of common construction, and the latter may be readily inserted in place upon the rim of a wheel, and there is thus provided a durable and efficient means for mechanically imparting resiliency to the tire.

While I have shown and described herein a satisfactory construction of parts embodying my invention, this may be changed to a greater or lesser degree without departing from the spirit and intent of the invention.

I claim—

1. A tire casing having means to secure its opposite edges to a rim, a series of circularly formed springs located within said casing throughout the length thereof, each spring being composed of a plurality of strips each resting against and circumferentially slidable one upon another, and means comprising a socket member to receive and loosely secure all the ends of said strips at each end of each of said springs.

2. A tire casing having means to secure its opposite edges to a rim, a series of circularly formed springs disposed within the tire casing throughout its length, each spring being independently active and having its ends spaced apart whereby the spring may be compressed to permit the tire casing to be placed in position, each of said springs being composed of a plurality of strips resting against and circumferentially slidable one upon another, and a socket member loosely inclosing the ends of all of the strips at each end of each of said springs.

3. A tire casing having means for securing its opposite edges to a wheel rim, a series of springs located within the tire casing throughout its length, each spring consisting of a number of strips lying closely one against the other, means for loosely securing the ends of said strips, and a metallic casing surrounding each spring and having one end forming a tongue arranged to pass through an opening in the opposite end and to be bent backwardly to secure the ends of the casing in place.

4. A tire casing having means for securing its opposite edges to a wheel rim, springs disposed in pairs throughout the length of said tire casing, the spring of each pair consisting of a plural number of strips resting loosely one against the other with means for securing said ends, a casing enveloping each spring, and a pocket of fabric or similar material inclosing each pair of springs.

5. A tire casing having means for securing its opposite edges to a wheel rim, springs disposed in pairs throughout the length of the tire casing, each spring comprising a plural number of strips lying loosely against each other with means for loosely securing the ends of the strips, a metallic casing enveloping each spring, a pocket of fabric or like material surrounding each pair of springs, and means for detachably securing the meeting edges of each pocket.

6. A tire casing having means for securing its opposite edges to a wheel rim, pockets located in said casing, a spring located in each pocket, and a filling piece located within each pocket between the wall thereof and the spring therein, said filling pieces being composed of rubber and originally shaped to conform to the curved shape of the outer and inner surfaces of said pocket and also to the shape of said spring.

7. A tire casing having means for securing its opposite edges to a wheel rim, a series of springs located within the tire casing throughout its length, and a metallic casing surrounding each spring and having one end forming a tongue arranged to pass through an opening in the opposite end and be bent backwardly to secure the ends of the casing in place.

8. A tire casing having means for securing its opposite edges to a wheel rim, springs disposed throughout the length of said tire casing, said springs each comprising a number of loosely superposed strips and a filling piece for each of said springs, said filling pieces conforming to the crosswise and circumferential shapes of the tire and having overturned edges to receive the springs and hold said strips in place.

9. A tire casing having means for securing its opposite edges to a wheel rim, a series of springs located within the tire casing throughout its length, said springs each comprising a number of loosely superposed strips lying closely one against the other, means for loosely securing the ends of said strips to permit free independent movement thereof, and a metallic casing surrounding each spring.

10. A tire casing having means for securing its opposite edges to a wheel rim, springs disposed in pairs throughout the length of said tire casing, the springs of each pair consisting of a plurality of strips resting loosely one against the other, a casing enveloping each spring, and a pocket of fabric or similar material inclosing each pair of springs.

11. A tire casing having means for securing its opposite edges to a wheel rim, springs disposed in pairs throughout the length of the tire casing, each spring comprising a plurality of strips lying loosely against each other, a metallic casing enveloping each spring and having its ends detachably united, a pocket of fabric or like material surrounding each pair of springs, and means for detachably securing the meeting edges of each pocket.

THEODORE THOMAS MILLER.

Witnesses:
ARTHUR B. JENKINS,
A. E. O'BRIEN.

Copies of this patent may be obtained for five cents each, by addressing the "Commissioner of Patents, Washington, D. C."